United States Patent
Ross et al.

(10) Patent No.: US 11,564,362 B2
(45) Date of Patent: *Jan. 31, 2023

(54) MYCELIUM GROWTH BED

(71) Applicant: MycoWorks, Inc., Emeryville, CA (US)

(72) Inventors: Philip Ross, San Francisco, CA (US); Matt Scullin, San Francisco, CA (US); Nicholas Wenner, Sebastopol, CA (US); Jordan Chase, Oakland, CA (US); Quinn Miller, Berkeley, CA (US); Ryan Salditos, San Francisco, CA (US); Phil McGaughy, Oakland, CA (US)

(73) Assignee: MycoWorks, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,028

(22) Filed: Jun. 14, 2021

(65) Prior Publication Data

US 2021/0298249 A1    Sep. 30, 2021

Related U.S. Application Data

(63) Continuation of application No. 16/657,974, filed on Oct. 18, 2019, now Pat. No. 11,032,982.

(Continued)

(51) Int. Cl.
*A01G 18/10* (2018.01)
*A01G 18/20* (2018.01)
(Continued)

(52) U.S. Cl.
CPC .............. *A01G 18/62* (2018.02); *A01G 18/10* (2018.02); *A01G 18/20* (2018.02); *A01G 18/60* (2018.02); *A01G 18/69* (2018.02)

(58) Field of Classification Search
CPC ........ A01G 18/10; A01G 18/20; A01G 18/22; A01G 18/60; A01G 18/61; A01G 18/62; A01G 18/64; A01G 18/65
(Continued)

(56) References Cited

U.S. PATENT DOCUMENTS 3,842,534 A * 10/1974 Walters .................. A01G 18/62
108/53.5
4,001,966 A * 1/1977 Metzner ................. A01G 18/62
47/1.1
(Continued)

FOREIGN PATENT DOCUMENTS

CN     105682480 A    6/2016
CN     106171515 A    12/2016
(Continued)

OTHER PUBLICATIONS

The State Intellectual Property Office of the Peoples Republic of China, Patent Search Report for Application No. 2019800795809, dated Nov. 15, 2021.

*Primary Examiner* — David J Parsley
(74) *Attorney, Agent, or Firm* — Temmerman Law; Mathew J. Temmerman (57) ABSTRACT

A mycelium growth bed for optimal production of pure mycelium or a pure mycelium composite with controlled or predictable properties, the bed comprising a tray, a conveying platform, a permeable membrane, a substrate, and a porous material. The permeable membrane is positioned on the conveying platform within the tray. The substrate is positioned on the permeable membrane and the porous material is positioned on top of the substrate. The system provides a configuration wherein the $CO_2$ concentration is held above 3%, the relative humidity is held above 40% and the $O_2$ concentration is held below 20% in steady state (Continued)

conditions to produce leather-like mycelium without fruiting bodies.

20 Claims, 5 Drawing Sheets

Related U.S. Application Data (60) Provisional application No. 62/747,571, filed on Oct. 18, 2018.

(51) Int. Cl.
  *A01G 18/60* (2018.01)
  *A01G 18/62* (2018.01)
  *A01G 18/69* (2018.01)

(58) Field of Classification Search
  USPC .......................................................... 47/1.1
  See application file for complete search history.

(56) References Cited

U.S. PATENT DOCUMENTS

| | | | | |
|---|---|---|---|---|
| 5,040,328 | A | * | 8/1991 | Coon ..................... A01G 18/62 206/505 |
| 6,018,906 | A | * | 2/2000 | Pia .......................... A01G 18/62 47/1.1 |
| 6,622,423 | B1 | * | 9/2003 | Riccardi ................ A01G 9/028 47/1.1 |
| 2013/0199088 | A1 | * | 8/2013 | Juscius .................. A01G 18/69 47/1.1 |
| 2018/0014468 | A1 | | 1/2018 | Ross |

FOREIGN PATENT DOCUMENTS

| | | |
|---|---|---|
| CN | 106479901 A | 3/2017 |
| CN | 107711290 A | 2/2018 |
| WO | 2014118757 A1 | 8/2014 |

* cited by examiner

MYCELIUM GROWTH BED

RELATED APPLICATIONS

This application is a continuation of U.S. patent application Ser. No. 16/657,974 filed Oct. 18, 2019, and granted as U.S. patent Ser. No. 11/032,982 on Jun. 15, 2021, and which claims the benefit of U.S. provisional patent application 62/747,571, filed Oct. 18, 2018, the disclosure of which is incorporated herein in its entirety.

BACKGROUND OF THE DISCLOSURE

Technical Field of the Disclosure

This invention relates generally to the nascent industry of fungal mycelium biofabrication, and more specifically to a mycelium growth bed having an optimal configuration for manufacturing mycelium leather without any fruiting bodies.

Description of the Related Art

Mycelium is a renewable natural resource that grows as part of the life cycle of a fungus. Mushrooms are one of nature's best decomposers, absorbing nutrients from their environment, transforming organic waste into new materials. As that occurs, the fungus can take the form of a mass of branching hyphae. The hyphae secrete enzymes into or onto a substrate food source, which breaks down the food source such that it can be absorbed into the mycelium. By controlling and directing the growth of these hyphae and mycelium, and by halting and restarting their growth at specific timeframes, leather-like materials can be created.

Leather-like fungal mycelium has garnered considerable interest in recent years as a material whose mechanical properties can be taken advantage of for a variety of uses. Mycelium can be used in a variety of applications, as a versatile material, that can replace various fossil-fuel or animal-derived materials such as plastics and leathers. Some such materials include polystyrene-like packaging materials or leather-like bio-fabrics (mycelium leather). Typically, these materials are derived from traditional methods of growing mycelium prior to and in preparation for the growing of fungal fruiting bodies such as for food.

Conventional means of growing organic matter involve myriad systems including bioreactors, vessels such as bags or boxes, incubators, fermenters, submerged reactors, and trays for solid state fermentation. Such growth vessels are used in other industries such as soybean growth and Koji fermentation. One such conventional growth vessel used in the field of industrial edible mushroom farming uses sawdust or other fiber-based media for spawn production of saprotrophic fungi. While large volumes of lignocellulose materials are grown, this is typically done in large bags or bottles so to fulfill the primary function in these industries of creating spawn and generating fruiting bodies for culinary and/or pharmaceutical ends, rather than to manufacture leather-like mycelium without fruiting bodies.

For fungal growth directed toward mycelium-based end products, such conventional methods will not suffice. To maximize mycelial growth, it has been found that restrictive environmental controls are required. One knowledgeable in the art understands that, while it has been shown that mycelium-based materials can be grown via such methods, optimizing the mycelium's growth external to its substrate rather than either the mycelium's growth within its substrate or the fruiting body's growth is neither trivial nor well understood. To-date, mycelium-based materials, particularly mycelium leathers, have been derived from mycelium growth performed in a manner consistent with edible fungal fruiting body (mushroom) production, such as in bottles, bags, or troughs, or in specially-controlled biological incubators whose wide range of tunability results in outsize cost and complexity. In other words, exomorphic vegetative hyphal and mycelial growth in response to environmental, chemical, material, thigmotaxic and other variable conditions.

Further, current processes for growing sheets of mycelium require multiple vessels, and multiple transfer steps throughout. Each time materials are transferred, there is a potential for infection or the introduction of secondary elements that can potentially ruin the fermentation process through infection. In addition to this risk, the increased exchange and transfer of materials means increased expense, as more equipment and manpower are required. Each additional, sequential transfer also introduces vectors for contamination and infection. Furthermore, the equipment currently being used for growing sheets of mycelium are not specifically meant for the particular process, rather the equipment made for other purposes must be altered to perform the necessary specific configurations for mycelium growth to generate sheets that are appropriate for commerce. Moreover, these methods do not produce leather-like mycelium and fail to produce mycelium with consistent thickness, uniformities or mechanical properties and hence are limited in their usefulness.

The current state of the art of mycelium growth beds requires elaborative control systems that introduce artificial conditions of gas, temperature, moisture, and overall environment. A new advancement in the current embodiment(s) utilizes the capabilities of a fungal colony to generate its own microenvironment wherein mycelium growth is encouraged, infection vectors are discouraged, and the mycelium is not inclined to advance to fruiting body formation as is the natural process of growth in nature. The current state of the art does not make elegant use of passive environmental states generated within a reactor design such as is in the current embodiment(s).

There is thus a need for an improved mycelium growth bed and a method for manufacturing leather-like mycelium materials and composites. Such a mycelium growth bed would provide an optimal configuration for manufacturing leather-like mycelium free of substrate particles and fruiting bodies. Such a growth bed would have dimensions, contents and gas exchange that are within a narrow and specific range to promote mycelium growth conducive to making a pure mycelium or pure mycelium composite with controlled or predictable properties as well as other pure-mycelium containing materials and composites. Further, such a growth bed would produce mycelium with consistent thickness, uniformities and mechanical properties to be used as a leather-like material. Moreover, such a growth bed would provide specific conditions that are rare or novel to nature. Furthermore, such a growth bed would provide environmental conditions that are never found in nature which enables production of uniform leather like mycelium grown consistently from batch to batch, and without fruiting body formation such as is implicitly imperative to traditional mushroom fermentation reactors. The present embodiment overcomes shortcomings in the field by accomplishing these critical objectives.

SUMMARY OF THE DISCLOSURE

To minimize the limitations found in the existing systems and methods, and to minimize other limitations that will be apparent upon the reading of the specifications, a preferred embodiment of the present invention provides a mycelium growth bed for producing mycelium leather and a method for optimal production of mycelium leather.

The mycelium growth bed comprises a tray, a conveying platform, a permeable membrane, a substrate, a porous material and a set of interchangeable lids. The tray includes an enclosed set of walls, a floor, and a lid. The floor is adaptable to detach and attach with the enclosing walls. The tray is made of a stiff material selected from a group consisting of: plastic, wood, fiberglass, and metal.

The material which comprises the floor, walls, and lid is selected to have a specific thickness, stiffness (or compliance), and thermal resistance; all in order to appropriately control the temperature of the training environment within the bed, as well as within the substrate that is within the bed. The compliance of the walls is also critical in allowing the myceliated substrate to be removed easily during manipulations and operations throughout the fermentation process.

The conveying platform is configured to fit within the tray and adaptable to support the weight of the substrate inoculated with a fungal strain that produces mycelium. The conveying platform preferably has dimensions that are at least 1 mm smaller than the inner dimensions of the tray it is placed within, however, dimensions greater or less than 1 mm smaller are provided as well. The permeable membrane includes a plurality of pores is positioned on the conveying platform and the substrate is positioned on the permeable membrane. The plurality of pores are spaced regularly throughout the permeable membrane so as to encourage even and regular growth of mycelium therethrough.

The substrate may be any typical and suitable fungal mycelium food source such as but not limited to potato dextrose, lignin, grain(s), wheat(s), mineral(s) or cellulose. In the preferred embodiment, the substrate includes a mix of hardwood and softwood particles supplemented with rye grains or materials rich in nitrogen such as but not limited to millet. The porous material is positioned on top of the substrate and held close to the permeable membrane. The porous material includes, but is not limited to, a woven or felted (non-woven) fabric introduced on top of the permeable membrane on top of the growing substrate.

The lid has a plurality of openings and is adaptable to detachably attach with the enclosing wall(s) of the tray. The plurality of openings on the lid allows exchange of gases including water vapor, carbon dioxide, nitrogen, and oxygen. The tray having the conveying platform, the permeable membrane having the substrate, the porous material and the lid are configured to attain an optimal configuration that precisely controls the volume, the weight, the substrate area and the air and gas exchange parameters to produce a leather-like material of pure mycelium, or of a mycelium-fabric composite comprising the porous layer with the mycelium grown therethrough.

The optimal configuration to produce a pure mycelium, or mycelium composite, with leather-like properties, is designed to ensure that only vegetative mycelium is grown within the bed, without the formation of fruiting bodies nor any fruiting body precursor.

Said configuration is such that the substrate weight to air volume (volume of empty space within the tray not occupied by the substrate) ratio is approximately 2.65 grams of substrate per cubic centimeter of air volume, and less preferably between 0.5 and 5 g/cc. The air volume to substrate volume is between 0.01 and 1.0 cc/cc, the air volume to substrate area is between 0.5 and 5.0 cc/cm$^2$, wherein the $CO_2$ concentration is held above 3% in steady state conditions, the relative humidity is held above 40% in steady state conditions, and wherein the $O_2$ concentration is held below 20% in steady state conditions; all to promote mycelium growth without fruiting body formation. Throughout this document the term "air volume" may be used to describe the negative space or volume of the tray not occupied by substrate. While typically this empty space volume will be filled with gas, and very typically that gas will be what is conventionally termed "air", it is to be understood that any gas or even the absence of gas may occupy the volume.

The improved system also includes a method for producing mycelium leather utilizing the mycelium growth bed, the method comprising the steps of providing a tray having an enclosed set of walls, a floor that may or may not be detachable and may or may not require a conveying platform configured to fit therein, positioning a permeable membrane having a plurality of pores on the conveying platform. Then, positioning a substrate inoculated with a fungal strain on the permeable membrane, positioning a porous material above the substrate such that the porous material held close to the permeable membrane and closing the tray with a lid to create an optimal configuration such that the substrate weight to air volume ratio is approximately 2.65 grams of substrate per cubic centimeter of air volume, and less preferably between 0.5 and 5 g/cc. The air volume to substrate volume is between 0.01 and 1.0 cc/cc, the air volume to substrate area is between 0.5 and 5.0 cc/cm2, wherein the $CO_2$ concentration is held above 3% in steady state conditions, the relative humidity is held above 40% in steady state conditions, and wherein the $O_2$ concentration is held below 20% in steady state conditions; all to promote mycelium growth without fruiting body formation.

A first objective of the present embodiment is to provide an improved mycelium growth bed and a method for manufacturing leather-like mycelium material.

A second objective of the present embodiment is to provide a mycelium growth bed and a method that provides an optimal configuration for manufacturing leather-like mycelium free of substrate particles and fruiting bodies.

A third objective of the present embodiment is to provide a mycelium growth bed that have dimensions, contents and gas exchange that are within a narrow and specific range to promote mycelium growth conducive to use as leather.

A fourth objective of the present embodiment is to provide a mycelium growth bed that produces mycelium with consistent thickness, uniformities and mechanical properties to be used as a leather-like material.

A fifth objective of the present embodiment is to provide a mycelium growth bed that provides specific conditions that are rare in nature and extremely difficult to locate in a laboratory environment.

Another objective of the present embodiment is to provide a mycelium growth bed that provides environmental conditions that are never found in nature which enables production of uniform leather like mycelium grown consistently from batch to batch.

These and other advantages and features of the present invention are described with specificity so as to make the present invention understandable to one of ordinary skill in the art.

BRIEF DESCRIPTION OF THE DRAWINGS

In order to enhance their clarity and improve the understanding of the various elements and embodiment, elements in the figures have not necessarily been drawn to scale.

Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means+/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
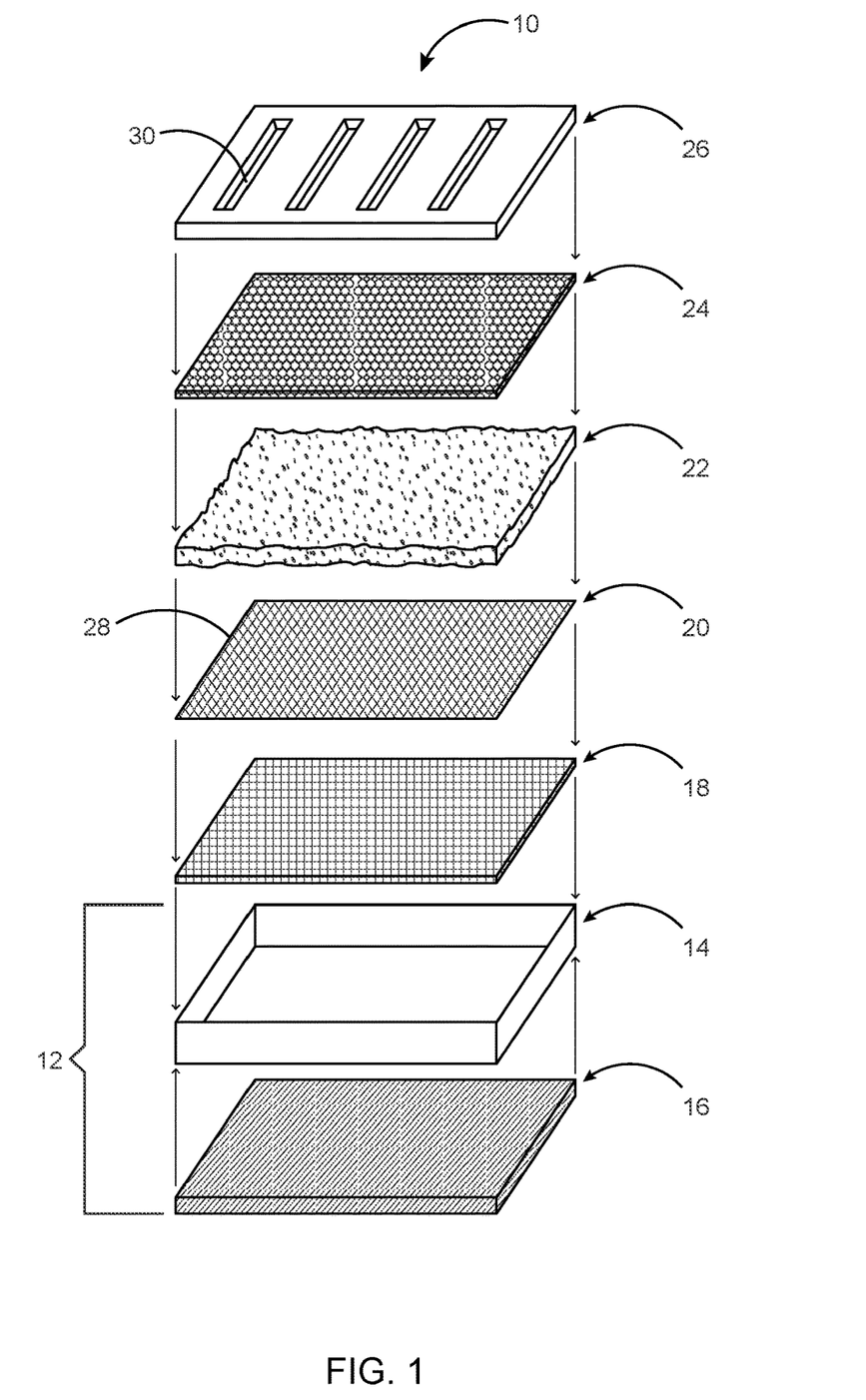
FIG. 1 illustrates an exploded perspective view of a mycelium growth bed in accordance with the preferred embodiment of the present invention.
Figure 2:
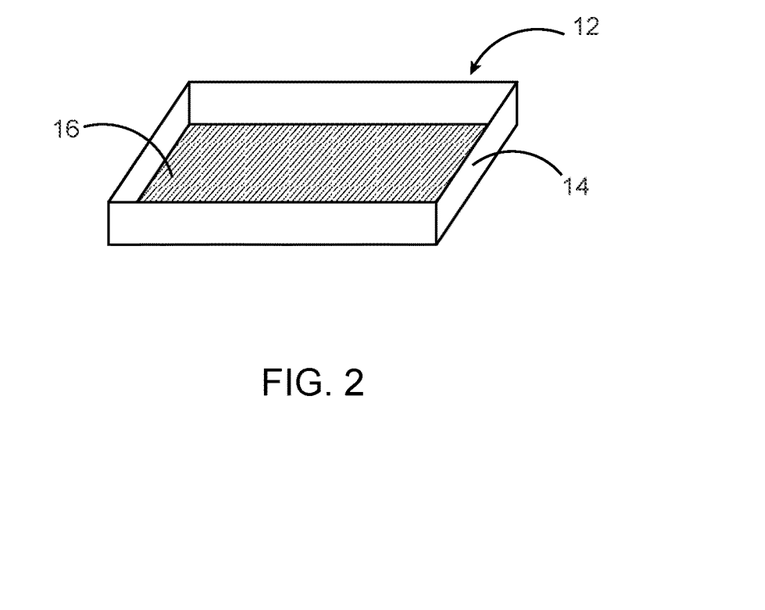
FIG. 2 illustrates a perspective view of a tray of the mycelium growth bed in accordance with the preferred embodiment of the present invention.
Figure 3:
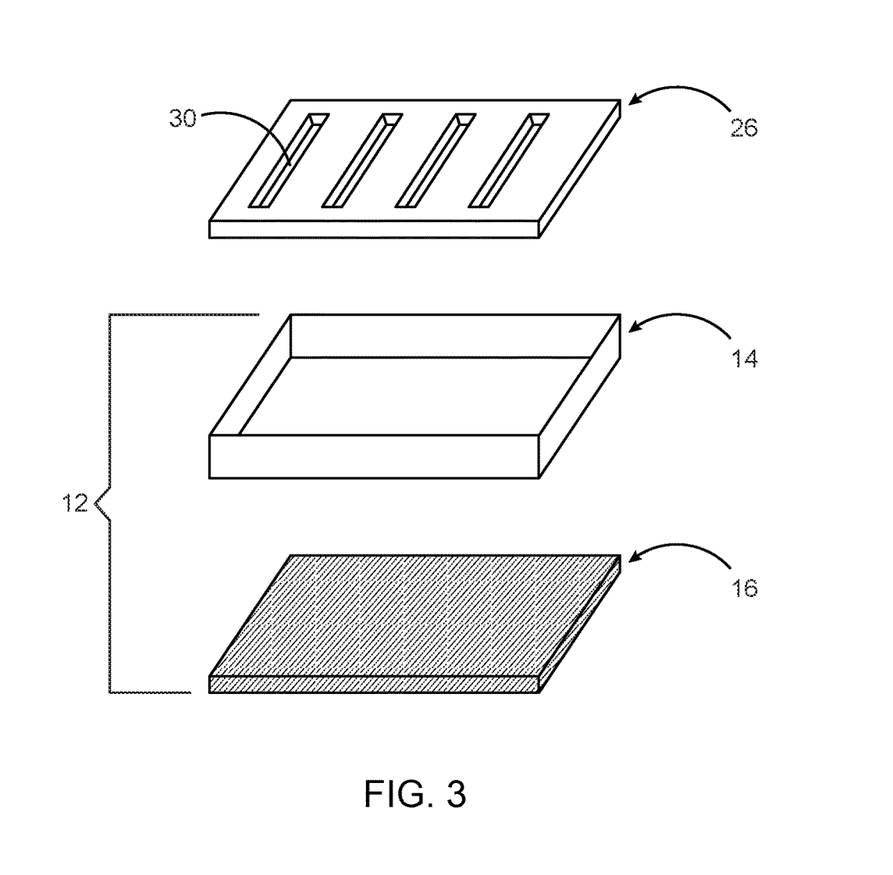
FIG. 3 illustrates an exploded perspective view of the tray and a lid of the mycelium growth bed in accordance with the preferred embodiment of the present invention.

Referring to FIGS. 1-3, an exploded perspective view of a mycelium growth bed 10 for producing mycelium leather in accordance with the preferred embodiment is illustrated. The mycelium growth bed 10 of the preferred embodiment of the present invention provides dimensions, contents and gas exchange within a narrow and specific range so as to promote mycelium growth in a novel manner that makes such mycelium conducive to use as environmentally friendly leather replacement material. In order to use mycelium as leather, mycelium produced must be free of any substrate material and fruiting bodies. Moreover, the mycelium cells should extend beyond the boundaries of its substrate but have not yet begun to differentiate into reproductive mushrooms. Specific and particular conditions are required to grow the mycelium cells to extend past their substrate without forming fruiting bodies. The mycelium growth bed 10 of the present invention provides an optimal configuration for this rare and difficult-to-achieve fungal mycelium growth and enables the production of uniform leather-like mycelium grown consistently from batch to batch.

The mycelium growth bed 10 for optimal production of a leather-like material comprises a tray 12, a conveying platform 18, a permeable membrane 20, a substrate 22, a porous material 24 and a lid 26. The tray 12 includes an enclosed wall 14 and a floor 16 as illustrated in FIG. 2. The floor 16 is adaptable to detachably attach with the enclosed wall 14 as illustrated in FIG. 3. The tray 12 is made of a stiff material selected from a group consisting of: plastic, wood, fiberglass, fiber-polymer composite and metal. The surface of the tray 12 is resistant to infiltration by the living media it holds.

The conveying platform 18 is configured to fit within the tray 12 and adaptable to support the weight of the substrate 22 inoculated with a fungal strain (not shown) that produces mycelium. The conveying platform 18 can be any rigid surface, with dimensions that allows it to fit within the tray 12 when placed therewithin. The conveying platform 18 is constructed in a manner to support the weight of the colonized substrate 22 and is adaptable to fit within the tray 12 when being transferred from the tray 12 to any secondary location. The conveying platform 18 must have dimensions that are preferably at least 1 mm smaller than the inner dimensions of the tray 12 it is placed within, however amounts of 1 mm or less than 1 mm are envisioned in alternative embodiments. The conveying platform 18 may be of any other smaller dimensions that are deemed appropriate for the function of acting as a conveying sled or carrying platform of the colonized substrate 22.

The permeable membrane 20 comprises a plurality of pores 28 and is positioned on the conveying platform 18 and the substrate 22 is positioned on the permeable membrane 20. The permeable membrane 20 holds the substrate 22 and regulates even growth of mycelium therethrough. The size of each of the plurality of pores 28 of the permeable membrane 20 can range between 1 micron and 1 millimeter. The plurality of pores 28 is spaced regularly throughout the permeable membrane 20 so as to encourage even and regular growth of mycelium therethrough. The permeable membrane 20 may be degradable by design or may be selected from a group consisting of: a mesh, fibers, nylon or other material that are resistant to decomposition from physical association with saprobic fungi. In an alternative embodiment he membrane 20 is predictably degradable by design such as it is consumed in the process of mycelium growth and/or are biodegradable as organic waste when the substrate is discarded post-harvest.

The substrate 22 can be any typical fungal mycelium food source such as potato dextrose, lignin, or cellulose. In one embodiment, the substrate 22 is a mixture of discrete particles and nutrients for mycelium growth, along with a specific moisture content (water). In the preferred embodiment, the substrate 22 includes a mix of hardwood and softwood particles supplemented with rye grains or materials rich in nitrogen. For the preferred optimal configuration of the present invention, the mix of hardwood and softwood particles comprises up to 95% of the solid media constituents of the substrate 22. These hardwood and softwood particles are supplemented with rye grains or other suitable materials that are rich in nitrogen. The rye grains or other suitable material comprises 5-15% of the total mass of the substrate 22. The substrate 22 is further altered with regard to the pH balance through the addition of Calcium Carbonate or other Calcium sources, such that the substrate 22 is adequate for the optimal growth and propagation of mycelium. Water is added to the substrate 22 such that the hydration of the substrate 22 provides saturated conditions that are adequate for the optimal growth and propagation of mycelium. In this embodiment, the substrate 22 is prepared to work in accordance with fungi species that includes the *Ganodermas* and *Trametes*, the order Polyporales and including all saprobic fungal candidates that derive sustenance from lignin and cellulose-rich sources; such as brown-rot and white-rot fungal species in general. The porous material 24 is positioned on top of the substrate 22 and held close to the permeable membrane 20. The porous material 24 includes, but is not limited to, a cotton fabric introduced on top of the growing substrate 22. In one embodiment, the porous material 24 can include different varieties of nylon and cotton, other meshes, such as electronic meshes, synthetic meshes such as Kevlar® ($[-CO-C_6H_4-CO-NH-C_6H_4-NH-]_n$ by DuPont de Nemours, Inc. of Wilmington, Del.), or other specialized materials that can be incorporated directly within the growing substrate 22. In the current embodiment, the porous material may comprise a single layer or multiple layers added in sequence, at varying orientations, and of multiple, unique materials in order to facilitate a uniquely engineered profile of macroscopic mechanical properties.

The lid 26, as illustrated in FIGS. 1 and 3, is adaptable to detachably attach with the enclosed wall(s) 14 of the tray 12. The lid 26 has a plurality of openings 30 that allows exchange of gases therethrough. The plurality of openings 30 for gas and vapor exchange on the lid 26 is at minimum of 0.2% of the surface area of the lid 26. When the tray 12 is covered by the lid 26, it allows exchange of some gas or all gaseous species, including water vapor, carbon dioxide, nitrogen, and oxygen. The plurality of openings in the current embodiment is a set of discrete holes that are distributed by mathematical design; in another embodiment the holes may be covered by or themselves comprise a layer of selectively permeable material such as flashspun high-density polyethylene fibers, such as Tyvek® by DuPont de Nemours, Inc. of Wilmington, Del.

The tray 12 having the conveying platform 18, the permeable membrane having the substrate 22, the porous material 24 and the lid 26 is configured to attain an optimal configuration that precisely controls the volume, the weight, the substrate area and the air and gas exchange parameters to produce mycelium leather. The optimal configuration of the preferred embodiment of the present invention is such that the air volume to substrate weight ratio is approximately 2.65 grams of substrate per cubic centimeter of air volume, and less preferably between 0.5 and 5 g/cc. The air volume to substrate volume is between 0.01 and 1.0 cc/cc, the air volume to substrate area is between 0.5 and 5.0 $cc/cm^2$, wherein the $CO_2$ concentration is held above 3% in steady state conditions, the relative humidity is held above 40% in steady state conditions, and wherein the $O_2$ concentration is held below 20% in steady state conditions. Throughout this document the term "air volume" may be used to describe the negative space or volume of the tray not occupied by substrate. While typically this empty space volume will be filled with gas, and very typically that gas will be what is conventionally termed "air", it is to be understood that any gas or even the absence of gas may occupy the volume.

This optimal configuration promotes leather-like mycelium growth without fruiting bodies.

The dimension of the tray 12 is in one embodiment 24 inches in width by 36 inches in length to create mycelium leather that has commercial interest and viability. The limitations of the disclosure are not bound by these dimensions, and a tray of any width by any length may be utilized. The tray 12 produces an apical expression of mycelium beyond the living substrate. The construction of the tray 12 with the permeable membrane 20 that is non-reactive to mycelium and the porous material 24 that is integrated directly into and within the substrate 22 allows the growth of apically expressed (vegetative) mycelium from the substrate 22. Also, the tray 12 with the permeable membrane 20 that is non-reactive to mycelium and the porous material 24 provides a means of easy removal of the mycelium when desired.

In one embodiment of the present invention, the dimensions of the tray 12 and the lid 26 are of any dimensions, such as but not limited to 24 inches in width by 36 inches in length, and the substrate weight to air volume ratio is between 0.05 and 1.5 cc/g. The air volume to substrate volume ratio of the tray 12 is between 0.05 and 1.5, its air volume to substrate area is between 0.5 and 5 $cc/cm^2$, the $CO_2$ concentration preferably held above 3% under steady state conditions, relative humidity preferably is held above 40% in steady state conditions, and $O_2$ concentration preferably held below 20% in steady state conditions. In other alternatives the $CO_2$ concentration is held above 4% and in still other alternatives the $CO_2$ concentration is held above 10%.

In another embodiment of the present invention, the dimensions of the tray 12 and the lid 26 are any dimensions, and the air volume to substrate weight ratio is between 0.1 and 1.0 cc/g. The air volume to substrate volume ratio of the tray is between 0.1 and 1.0, its air volume to substrate area is between 1.0 and 2 $cc/cm^2$, the $CO_2$ concentration is held above 4% under steady state conditions, the relative humidity is held above 40% in steady state conditions and the $O_2$ concentration is held below 20% in steady state conditions. In other alternatives the $CO_2$ concentration is held above 10%.

Figure 4:
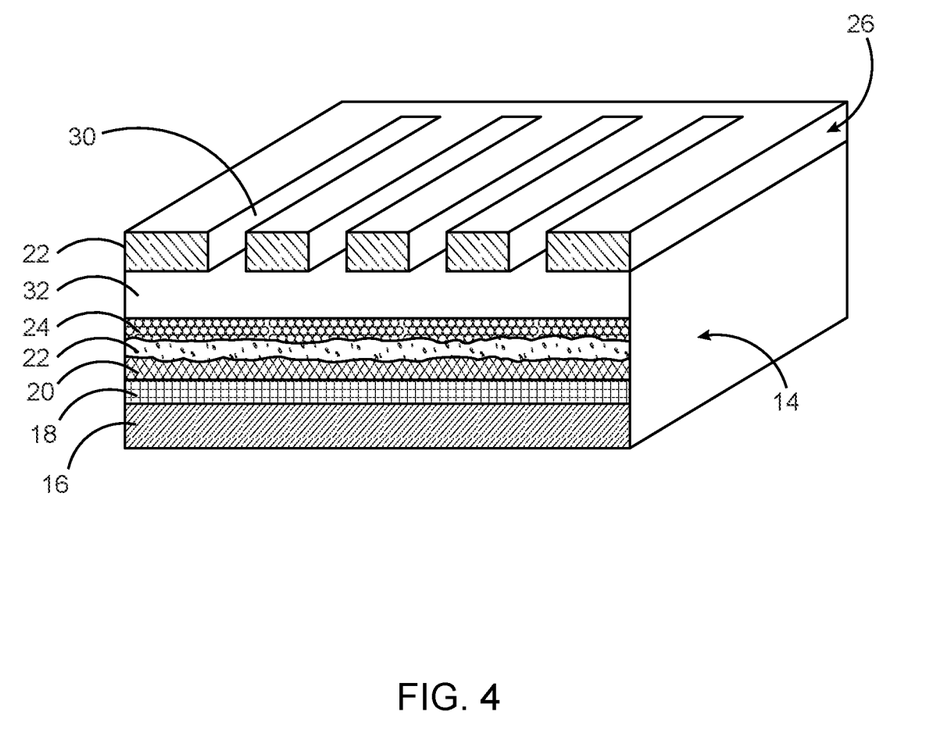
FIG. 4 illustrates a cross-sectional view of the mycelium growth bed in accordance with the preferred embodiment of the present invention.

FIG. 4 illustrates a cross-sectional view of the mycelium growth bed 10 in accordance with the preferred embodiment of the present invention. The mycelium growth bed 10 having the tray 12 with the detachable floor 16, the conveying platform 18, the permeable membrane 20 having the substrate 22, the porous material 24 and the lid 26 configured to attain the optimal configuration is illustrated in FIG. 4. The optimal configuration precisely controls the volume, the weight, the substrate area and the air and gas exchange parameters to produce mycelium leather.

In yet another alternative embodiment of the present invention, the enclosed wall 14 of the tray 12 is made from thermoplastics and is between 1 to 6 inches in height. The enclosed wall 14 of the tray 12 comprise materials that have the capacity to endure sterilization temperatures as is required in the preparation of wood decomposing substrate, is scratch resistant, light fast, and capable of being used for 1-120 or more repeated cycles of use.

In another preferred embodiment of the invention, the floor 16 of the tray 12 is composed in such a manner that it may be readily affixed to the enclosed wall 14 of the tray 12, and to join together to form an air and water tight connection after it has been affixed. After being joined with the enclosed wall 14, the tray 12 is capable of holding the apportioned volume of the colonized substrate 22 and has the ability to transport the substrate 22 within the various steps of its preparation and processing.

Figure 5A:
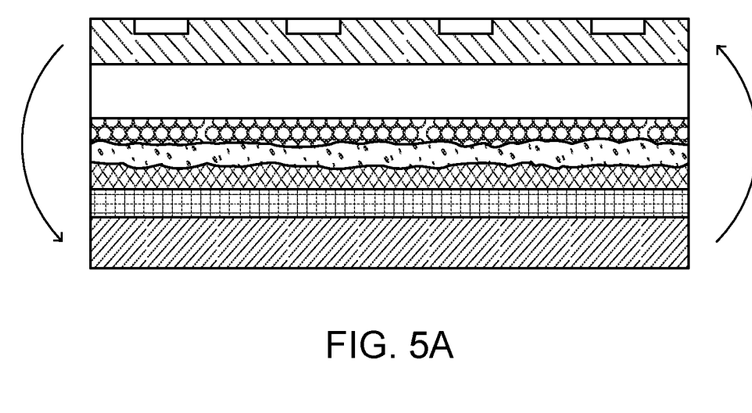
FIG. 5A illustrates a cross-sectional view of the mycelium growth bed in a first orientation in accordance with the preferred embodiment of the present invention.
Figure 5B:
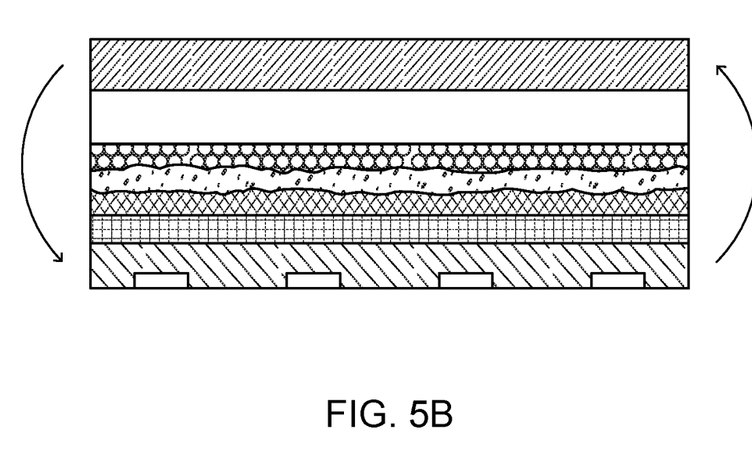
FIG. 5B illustrates a cross-sectional view of the mycelium growth bed in a second inverted orientation in accordance with the preferred embodiment of the present invention.

Referring to FIGS. 5A and 5B, a cross-sectional view of the mycelium growth bed 10 in a first orientation and a second inverted orientation is illustrated respectively. The floor 16 and the lid 26 are easily interchangeable. In the first orientation, the lid 26 is positioned on top of the tray 12 and attached to the enclosed wall 14 of the tray 12. In the second inverted configuration, the floor 16 is positioned on top of the enclosed wall 14 and the lid 26 is attached to the bottom of the enclosed wall 14. The tray 12 allows for the inversion and reversion of topological components required for growing mycelium. The tray 12 allows for easy movement of components and alteration of the growing medium without causing deformations to the contents within.

In another embodiment of the invention, the dimensions of the tray 12 and the lid 26 are of any dimensions, such as but not included to 24 inches in width by 36 inches in length, with the lid 26 acting to regulate the exchange of gasses between the environment within the tray 12 and the environment outside the tray 12, such that the permeable area of the lid 26 is equivalent to the plurality of openings 30 which is equivalent to a 1.75" square area of the lid 26, or 0.2% of the proportional area of a 24"×36" lid that covers the substrate 22. The lid 26 is composed in such a manner that it may readily be affixed to the wall 14 of the tray 12, and joined together to form a suitable air and watertight connection after it has been affixed. The design and construction of the floor 16 and the lid 26 of the tray 12 is in such a manner that they may be readily attached interchangeably and have the fixturing machinery or components to be easily taken apart and put back together in the reversal of these orderings of the top and bottom of the tray 12 as illustrated in FIGS. 5A and 5B.

In a still further alternative embodiment of the invention, the lid 26 and elements of the tray 12 may include active devices or elements such as electronic ports, as opposed to using a membrane patch. Further, in this embodiment, electronic monitors may enable analyzation (and characterization) of gasses in real time, air pumps and regulators may control the gas exchange, and an aspirator may be used to control humidity. Temperature controls, variable settings, responsive control systems may also be employed as alternative embodiments.

Still a further embodiment of the present invention including active or designed elements as a part of the lid 26 may alternatively be added to reduce water precipitation from atmospheric humidity.

Another embodiment of the present invention includes influencing the growth and direction of mycelium through remote action or controls, such as sound or vibration, varying wavelengths of both light and sound of varying duration, as well as other alternatives for the actuation and manipulation of hyphal and mycelial growth. Elements that include thigmotropic influences, sonic waves or other signals, lasers, (pneumatic or hydraulic pressure differences, atmospheric chemistry, biosignals) or vibrating air or any other means of actuation that causes the movement of the mycelium to come in contact with itself as a result. In another alternative embodiment, a magnetic device may be positioned underneath, linking to a ball or other metal object inside the tray 12, which rolls and moves around the surface to accomplish the functions required for tending the growing mycelium may be employed.

Modifications of the growing substrate 22 can be made to achieve similar growth parameters in expression without an intermediary non-reactive layer. While a permeable physical material such as but not limited to cotton, linen, polyester, rayon, metal mesh, plastics such as latex with induced pores, nylon, cashmere wool, Kevlar®, silk, satin, or a screen print may be used, a similar outcome of determined expression or non-expression of mycelium at a particular XY coordinate of the growing substrate's surface can be accomplished through application of an antibiotic substance applied to the substrate's surface to create a projective mask or scrim similar to that used in photolithography for defining geophysical limitations through printed negatives. Similarly, a laser or other heating element may be used to sinter the surface of the living substrate to achieve the same permeable capabilities of the nylon, thereby allowing promotion, negation, or modulation of hyphal and mycelial growth through this synthetic construct.

Figure 6:
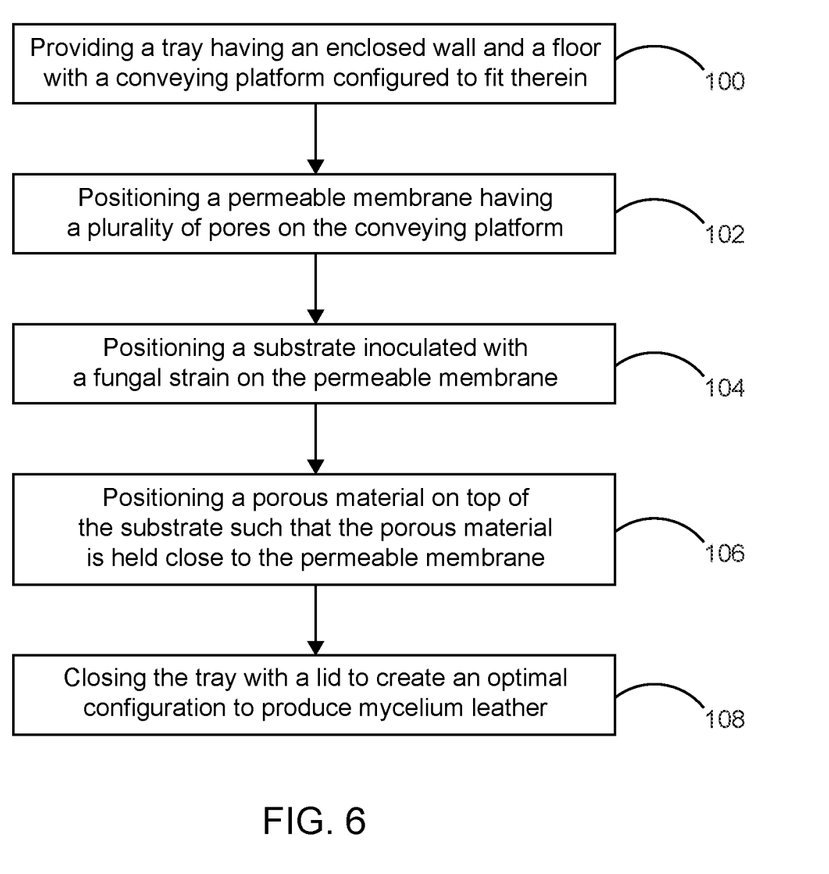
FIG. 6 illustrates a flowchart of a method for producing mycelium leather utilizing the mycelium growth bed in accordance with the preferred embodiment of the present invention.

FIG. 6 illustrates a flowchart of a method for producing mycelium leather utilizing the mycelium growth bed in accordance with the preferred embodiment of the present invention. The method comprises the steps of: providing a tray having an enclosed wall and a floor with a conveying platform configured to fit therein as indicated at block 100. Positioning a permeable membrane having a plurality of pores on the conveying platform as indicated at block 102. Then, positioning a substrate inoculated with a fungal strain on the permeable membrane as indicated at block 104. Positioning a porous material on top of the substrate such that the porous material held close to the permeable membrane as indicated at block 106 and closing the tray with a lid to create an optimal configuration to produce mycelium leather as indicated at block 108 such that the substrate weight to air volume ratio is between 0.5 and 5 g/cc. The air volume to substrate volume is between 0.01 and 1.0 cc/cc, the air volume to substrate area is between 0.5 and 5.0 $cc/cm^2$, wherein the $CO_2$ concentration is held above 3% in steady state conditions, the relative humidity is held above 40% in steady state conditions, and wherein the $O_2$ concentration is held below 20% in steady state conditions; all to promote mycelium growth without fruiting body formation.

The optimal configuration precisely controls the volume, the weight, the substrate area and the air and gas exchange parameters to produce mycelium leather. The method provides an apical expression of mycelium beyond the living substrate and allows easy removal of the mycelium when desired.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A mycelium growth bed, comprising:
a tray, a substrate positioned in the tray and inoculated with a fungal strain, a lid attached to the tray to form an optimal configuration such that the substrate weight to tray empty space volume ratio is between 0.5 and 5.0 g/cc, the tray empty space volume to substrate volume is between 0.01 and 1.0, the tray empty space volume to substrate area is between 0.5 and 5.0 cc/cm2, wherein the $CO_2$ concentration is held above 3% in steady state conditions, the relative humidity is held above 40% in steady state conditions, and wherein the $O_2$ concentration is below 20% in steady state conditions to promote mycelium growth without the generation of fruiting bodies.

2. The mycelium growth bed of claim 1 wherein the tray includes a wall and at least one the lid or floor is adaptable to detachably attach with the enclosed wall.

3. The mycelium growth bed of claim 1 wherein the lid comprises a plurality of gas exchanging openings.

4. The mycelium growth bed of claim 3 wherein the plurality of gas exchanging openings are at minimum 0.2% of the lid's surface area.

5. The mycelium growth bed of claim 1 wherein the lid has an opening that allows for gas exchange.

6. The mycelium growth bed of claim 1 wherein the opening is at minimum 0.2% of the lid's surface area.

7. The mycelium growth bed of claim 1 wherein the substrate includes a mix of hardwood and softwood particles supplemented grains rich in nitrogen.

8. The mycelium growth bed of claim 1 wherein the tray is non-reactive to mycelium.

9. A mycelium growth bed for optimal production of pure mycelium or a mycelium composite with controlled predictable properties, comprising:
a tray having an enclosed wall and an attached floor;
wherein the tray is adaptable to support the weight of a substrate positioned in the tray and inoculated with a fungal strain that produces mycelium;
a lid attached to the tray to form an optimal configuration such that the substrate weight to tray empty space volume ratio is between 0.5 and 5.0 g/cc, the tray empty space volume to substrate volume is between 0.01 and 1.0, the tray empty space volume to substrate area is between 0.5 and 5.0 cc/cm$^2$; and
wherein the $CO_2$ concentration is above 3% in steady state conditions, the relative humidity is above 40% in steady state conditions, and wherein the $O_2$ concentration is below 20% in steady state conditions to promote mycelium growth without fruiting body.

10. The mycelium growth bed of claim 9 wherein the tray comprises a stiff material selected from a group consisting of: plastic, wood, fiberglass and metal.

11. The mycelium growth bed of claim 9 wherein the substrate consists of a fungal mycelium food source.

12. The mycelium growth bed of claim 9 wherein the substrate comprises a fungal mycelium food source.

13. The mycelium growth bed of claim 9 wherein the lid has an opening that allows for gas exchange.

14. The mycelium growth bed of claim 9 wherein the substrate includes a mix of hardwood and softwood particles supplemented with grains materials rich in nitrogen.

15. The mycelium growth bed of claim 9 wherein the tray produces an apical expression of mycelium beyond the living substrate.

16. The mycelium growth bed of claim 9 wherein the tray allows for the inversion and reversion of topological components required for growing mycelium.

17. A method for producing optimized, efficient, high-throughput and low-cost pure mycelium or a mycelium composite with controlled predictable properties, the method comprising the steps of:
a. providing a tray having an enclosed wall and a floor;
b. positioning a substrate inoculated with a fungal strain on the tray;
c. positioning a lid attached to the tray to form an optimal configuration such that the substrate weight to tray empty space volume ratio is between 0.5 and 5.0 g/cc, the tray empty space volume to substrate volume is between 0.01 and 1.0, the tray empty space volume to substrate area is between 0.5 and 5.0 cc/cm2; and
d. wherein the $CO_2$ concentration is above 3% in steady state conditions, the relative humidity is above 40% in steady state conditions, and wherein the $O_2$ concentration is below 20% in steady state conditions to promote mycelium growth without fruiting body.

18. The mycelium growth bed of claim 17 wherein the substrate consists of a fungal mycelium food source.

19. The method of claim 17 wherein an apical expression of mycelium is produced beyond the living substrate and allows easy removal of the mycelium.

20. The method of claim 17 allows for the inversion and reversion of topological components required for growing mycelium.

* * * * *